(12) United States Patent
Sura et al.

(10) Patent No.: US 9,862,249 B2
(45) Date of Patent: Jan. 9, 2018

(54) VEHICLE VENT POSITIONING APPARATUS

(71) Applicant: Nissan North America, Inc., Franklin, TN (US)

(72) Inventors: Bhargav Sura, Sterling Heights, MI (US); David Lyon, Livonia, MI (US)

(73) Assignee: Nissan North America, Inc., Franklin, TN (US)

( * ) Notice: Subject to any disclaimer, the term of this patent is extended or adjusted under 35 U.S.C. 154(b) by 158 days.

(21) Appl. No.: 14/927,644

(22) Filed: Oct. 30, 2015

(65) Prior Publication Data

US 2017/0120723 A1 May 4, 2017

(51) Int. Cl.
*B60H 1/00* (2006.01)
*B64D 13/00* (2006.01)
*B60H 1/34* (2006.01)

(52) U.S. Cl.
CPC ..... *B60H 1/00764* (2013.01); *B60H 1/00771* (2013.01); *B60H 1/00871* (2013.01); *B60H 1/3421* (2013.01)

(58) Field of Classification Search
CPC ........................ B60H 1/00764; B60H 1/00771
See application file for complete search history.

(56) References Cited

U.S. PATENT DOCUMENTS

| | | | | |
|---|---|---|---|---|
| 5,871,232 A * | 2/1999 | White | ............... | B60R 21/01534 280/735 |
| 6,386,965 B1 * | 5/2002 | Greenwald | ........ | B60H 1/00742 165/41 |
| 6,550,686 B2 * | 4/2003 | Kawai | ..................... | G01K 1/026 236/49.3 |
| 7,497,251 B2 * | 3/2009 | Ichishi | ............... | B60H 1/00792 165/202 |
| 7,699,691 B1 * | 4/2010 | Voigt | ................. | H05K 7/20154 165/104.33 |
| 8,057,288 B2 * | 11/2011 | Konet | .................. | B60H 1/3428 454/152 |
| 8,210,913 B2 * | 7/2012 | De Marino | ........ | B60H 1/00742 454/152 |
| 2007/0243810 A1 * | 10/2007 | Browne | ............. | B60H 1/00871 454/152 |
| 2014/0060795 A1 * | 3/2014 | Yu | ...................... | B60H 1/00821 165/202 |

(Continued)

*Primary Examiner* — Steven B McAllister
*Assistant Examiner* — Jonathan Cotov
(74) *Attorney, Agent, or Firm* — Global IP Counselors, LLP

(57) ABSTRACT

A vehicle vent positioning apparatus includes a motion sensor, a blower of an HVAC system, a vent assembly, a positioning device and a controller. The motion sensor detects changes in direction of movement of a vehicle. The blower moves air into a passenger compartment of the vehicle. The vent assembly is installed within the vehicle to direct airflow from the blower into a passenger compartment. The vent assembly includes at least one vane positionable to aim airflow into the passenger compartment in differing airflow directions. The positioning device is connected to the vane. The controller is configured to operate the positioning device to re-position the vane from aiming the airflow in a first airflow direction to aiming the airflow in a second airflow direction in response to the controller determining via signals from the motion sensor that the vehicle is changing direction of movement.

14 Claims, 6 Drawing Sheets

(56) References Cited

U.S. PATENT DOCUMENTS

| | | | |
|---|---|---|---|
| 2015/0116200 A1* | 4/2015 | Kurosawa | B60K 35/00 345/156 |
| 2015/0239320 A1* | 8/2015 | Eisenhour | B60H 1/00757 454/75 |
| 2015/0273984 A1* | 10/2015 | Suzuki | B60H 1/00007 454/152 |

* cited by examiner

VEHICLE VENT POSITIONING APPARATUS

BACKGROUND

Field of the Invention

The present invention generally relates to vehicle vent positioning apparatus. More specifically, the present invention relates to vent positioning apparatus that automatically adjusts direction of airflow through an HVAC vent in response to the vehicle making a turn.

Background Information

Vehicles usually include a heating, ventilation and air conditioning system (HVAC system) that includes vent assemblies. The vent assembly directs airflow into a passenger compartment of the vehicle. Many vent assemblies include pivoting vanes that can be moved to aim airflow therethrough in a plurality of differing directions into the passenger compartment. The aiming of the vent assemblies can be adjusted or set by a vehicle passenger. Once the vanes of a vent assembly are adjusted by the passenger, the vanes are static and remain in the position set by the passenger.

Under certain circumstances, such as making a sharp turn, the airflow from the vent assembly can change direction relative to the passenger. This apparent change in direction of the airflow can be noticed by the passenger, and in certain circumstances can be uncomfortable. The apparent change in direction of the airflow is explained using Newton's laws of motion. Specifically a body in motion stays in motion unless acted upon by another body. Since air in the airflow leaves the vent assembly in a fixed direction, when the vehicle is making a turn, the airflow generally continues to move in the fixed direction from the vent assembly while the vehicle is changing its direction of movement. Hence, when the vehicle turns, the airflow that has just left the vent assembly appears to change direction within the vehicle, as perceived by the passenger. In other words, the air continues in a fixed direction while the vehicle changes direction. The passenger believes the airflow has changed direction, when in fact, it is the vehicle that has changed direction while the airflow continues in its original direction.

SUMMARY

One object of the present disclosure is to provide a vent assembly with a means for compensating for relative movement of airflow from the vent assembly during a turning of a vehicle.

In view of the state of the known technology, one aspect of the present disclosure is to provide a vehicle vent positioning apparatus with a motion sensor, a blower, at least one vent assembly, a positioning device and a controller. The motion sensor is installed to a vehicle and detecting changes in direction of movement of the vehicle. The blower is part of an HVAC system within the vehicle and is operable to move air into a passenger compartment of the vehicle. The vent assembly is installed within the vehicle to direct airflow from the blower into a passenger compartment. The vent assembly includes at least one vane positionable to aim airflow moving through the vent and into the passenger compartment in a plurality of differing airflow directions. The positioning device is connected to the vane. The controller is connected to the motion sensor and the positioning device and is configured to operate the positioning device to re-position the vane from aiming the airflow in a first airflow direction to aiming the airflow in a second airflow direction in response to the controller determining via signals from the motion sensor that the vehicle is changing direction of movement.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
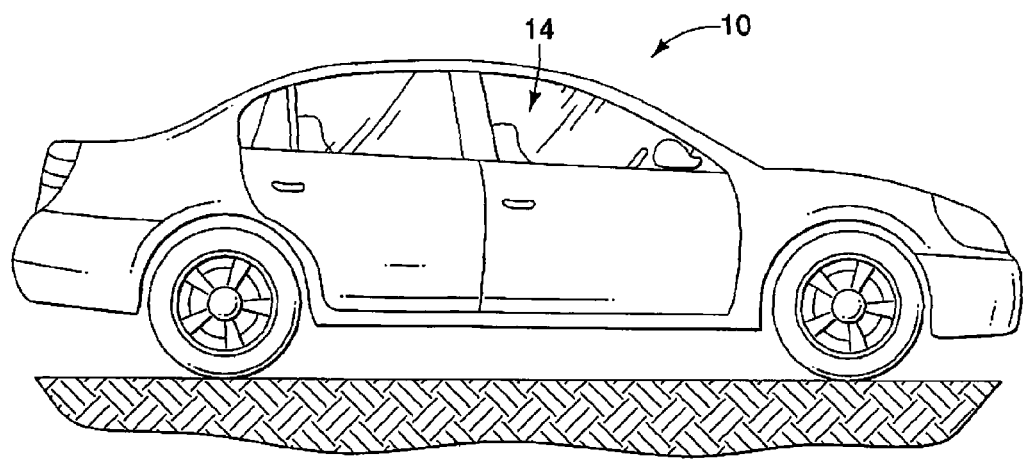
FIG. 1 is a side view of a vehicle that includes a passenger compartment and a vent positioning system in accordance with a first embodiment.

Referring initially to FIG. 1, a vehicle 10 that includes a vent positioning apparatus 12 (FIGS. 3 and 4) is illustrated in accordance with a first embodiment. The vent positioning system 12 is described in greater detail below.

Figure 2:
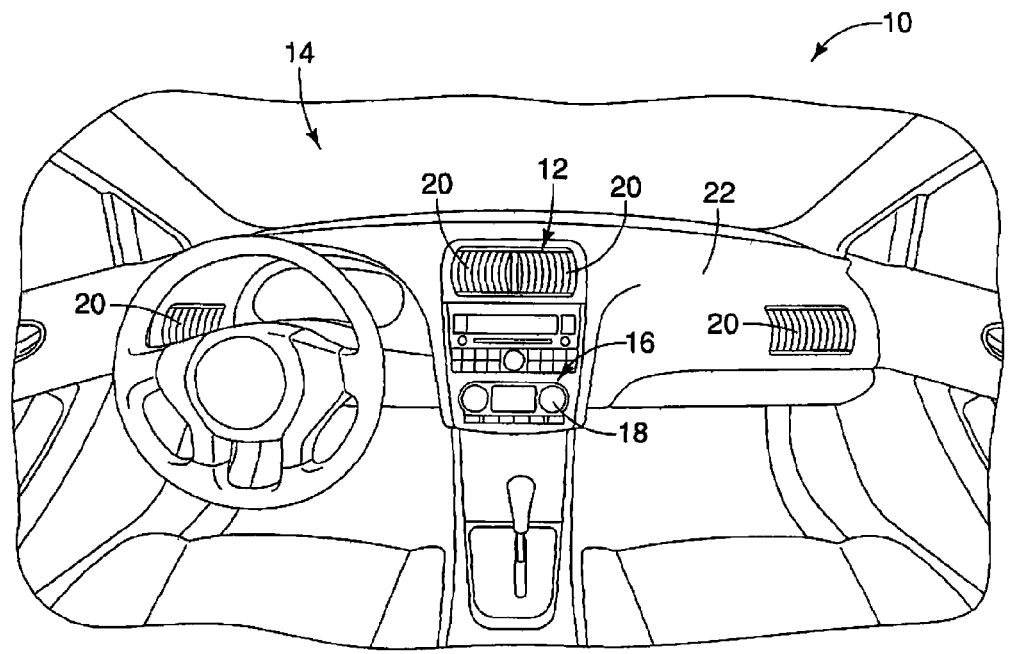
FIG. 2 is view of the passenger compartment of the vehicle depicted in FIG. 1, showing an instrument panel that includes a plurality of vent assemblies that are part of the vent positioning system in accordance with the first embodiment.

As shown in FIG. 2, the vehicle 10 defines a passenger compartment 14 and includes an HVAC system 16 that has a control panel 18 and a plurality of vent assemblies 20 that are installed at various locations along an instrument panel 22. Each of the vent assemblies 20 is configured to direct air from the HVAC system 16 into the passenger compartment 14, as is described in greater detail below.

The vehicle 10 can be any of a variety of vehicles. In FIG. 1, the vehicle 10 is depicted as a four door sedan. However, the vehicle 10 can alternatively be an SUV, a truck, a compact vehicle, a coupe or a large commercial vehicle. Further, the vehicle 10 can be provided with any of a variety of power plants, such as an electric powered motor, a hybrid motor system (electric motor and hydrocarbon powered motor combination), gas powered motor, or a diesel powered motor.

The HVAC system 16 includes a compressor (not shown), an evaporator (not shown), a condenser (not shown) and an air handling assembly (not shown) that directs air to the vent assemblies 20. The air handling assembly also includes a heater core (not shown) and a blower 24. Consequently, the HVAC system 16 is configured to provide cooled air from the vent assemblies 20 or heated air via the vent assemblies 20, depending upon the desire and selections made by a vehicle occupant while the vehicle 10 is being operated. Since HVAC systems 14, compressors, evaporators, condensers, air handling assemblies and heater cores are conventional elements of vehicle, further description is omitted for the sake of brevity.

A description of the vent positioning system 12 is now provided with specific reference to FIGS. 3-16. As shown schematically in FIGS. 3-4, the vent positioning system 12 includes a motion sensor 26, a speed sensor 28, the vent assemblies 20 and a controller 30.

The motion sensor 26 can be installed at any of a plurality of locations within the vehicle 10 in order to detect changes in direction of movement of the vehicle 10. The motion sensor 26 can be a stand-alone sensor installed within, for example, an engine compartment (not shown) of the vehicle 10 or can be a mechanism coupled to the steering wheel detecting rotational movement of the steering wheel of the vehicle 10. Alternatively, the motion sensor 26 can be a link to a global positioning satellite system (a GPS system) within the vehicle 10, whereby signals from the GPS serve as the motion sensor 26. Hence, in FIG. 4, the motion sensor 26 is only shown schematically. The motion sensor 26 is specifically configured to detect changes in direction of movement of the vehicle 10, including detecting that the vehicle 10 is making a right turn and detecting that the vehicle 10 is making a left turn.

Similarly, the speed sensor 28 can be installed at various locations within the vehicle 10. For example, the speed sensor 28 can be a stand-along sensor with the vehicle 10, or can be coupled to a speedometer installed to the instrument panel 22. The speed sensor 28 is configured to detect speed of movement of the vehicle 10. Hence, in FIG. 4, the motion sensor 26 is only shown schematically.

Figure 3:
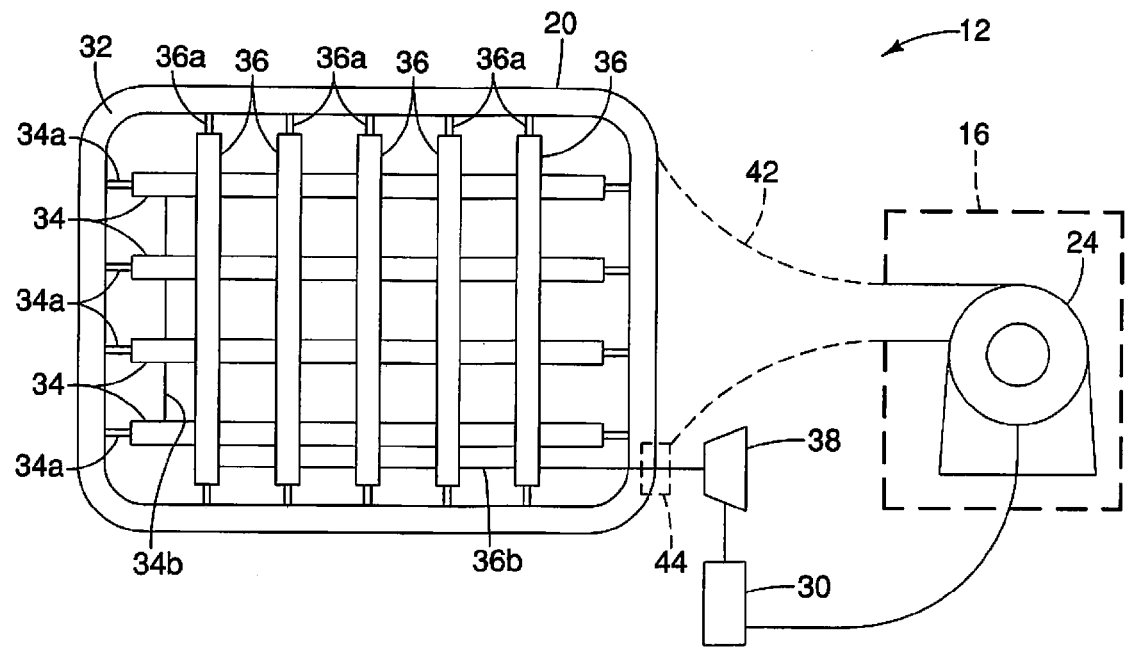
FIG. 3 is a schematic view of one of the vent assemblies showing a plurality of vertically oriented vanes, a positioning device connected to the vertically oriented vanes and a blower that provides airflow to the vent assemblies in accordance with the first embodiment.

A description of the vent assembles 20 is now provided with specific reference to FIGS. 3 and 5-7. Only one of the vent assemblies 20 is shown in FIG. 3. The vent assemblies 20 are installed at differing locations along the instrument panel 22, as shown in FIG. 2. The number of vent assemblies 20 can vary vehicle to vehicle. In the depicted embodiment shown in FIG. 2, there are four vent assemblies 20. However, it should be understood that more than four or fewer that four can be installed within the vehicle 10. Since the vent assemblies 20 are all basically the same, description of one applies equally to all of the vent assemblies 20.

The vent assembly 20 basically includes a housing 32, a plurality of horizontally extending vanes 34, a plurality of vertically extending vanes 36 and a positioning device 38. The housing 32 defines an opening 40 and is connected via an air duct 42 to the blower 24 of the HVAC system 16. The opening 40 is dimensioned and shaped to receive airflow produced by the operation of the blower 24 and direct the airflow into the passenger compartment 14 of the vehicle 10. The housing 32 is also configured to support and retain the plurality of horizontally extending vanes 34 and the plurality of vertically extending vanes 36.

As shown in FIG. 3, the plurality of horizontally extending vanes 34 are supported by the housing 32 spanning the opening 40. The plurality of horizontally extending vanes 34 are able to pivot about respective shafts 34a shown at opposite ends of each of the horizontally extending vanes 34. The shafts 34a are parallel to one another. The horizontally extending vanes 34 are connected to one another via a connecting rod 34b such that the horizontally extending vanes 34 pivot together synchronously (in unison). Since air movement directing vanes, such as the horizontally extending vanes 34 are conventional features, further description is omitted for the sake of brevity.

As is also shown in FIG. 3, the plurality of vertically extending vanes 36 are also supported by the housing 32 spanning the opening 40 in a direction perpendicular to the horizontally extending vanes 34. The plurality of vertically extending vanes 36 are able to pivot about respective shafts 36a shown at opposite ends of each of the vertically extending vanes 36. The shafts 36a are parallel to one another. The vertically extending vanes 36 are connected to one another via a connecting rod 36b such that the vertically extending vanes 36 pivot together synchronously (in unison).

The plurality of horizontally extending vanes 34 and plurality of vertically extending vanes 36 are installed within the vehicle 10 to direct airflow from the blower 24 into the passenger compartment 14. More specifically, the plurality of horizontally extending vanes 34 and plurality of vertically extending vanes 36 of the vent assembly 20 are positionable to aim airflow moving through the vent assembly 20 into the passenger compartment 14 in a plurality of differing airflow directions, depending upon the positioning of the plurality of horizontally extending vanes 34 and plurality of vertically extending vanes 36. The positioning of the plurality of horizontally extending vanes 34 determines the Y or vertical direction of the airflow (upward or downward relative to the vehicle passenger or directly rearward from the vent assembly 20 toward the vehicle passenger) and the positioning of the plurality of vertically extending vanes 36 determines the horizontal direction of the airflow (left or right of the vehicle passenger or directly rearward to the vehicle passenger).

Figure 5:
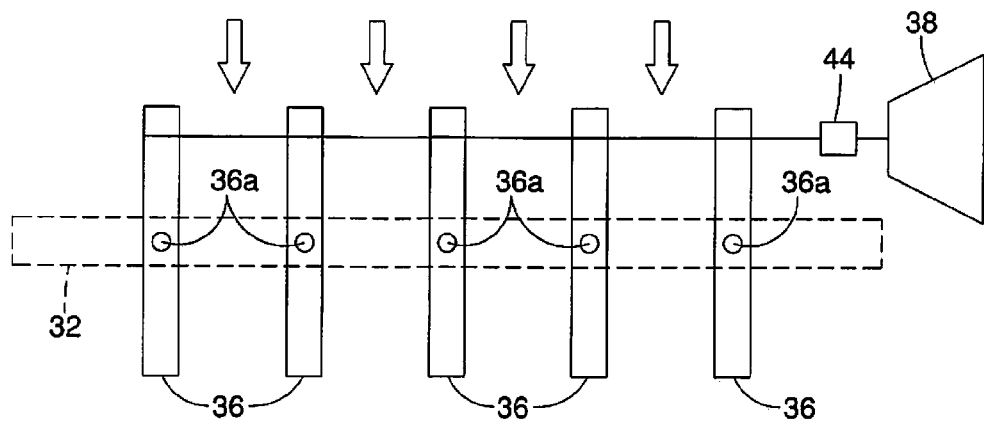
FIG. 5 is a schematic view of the vertically oriented vanes of the vent assembly connected to the positioning device in accordance with the first embodiment.
Figure 6:
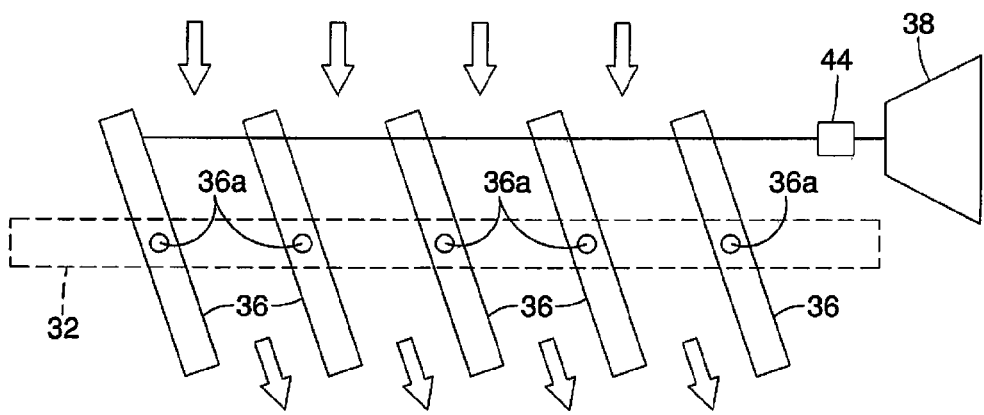
FIG. 6 is another schematic view of the vertically oriented vanes of the vent assembly similar to FIG. 5 showing the vertically oriented vanes pivoted in a first direction by the positioning device in accordance with the first embodiment.
Figure 7:
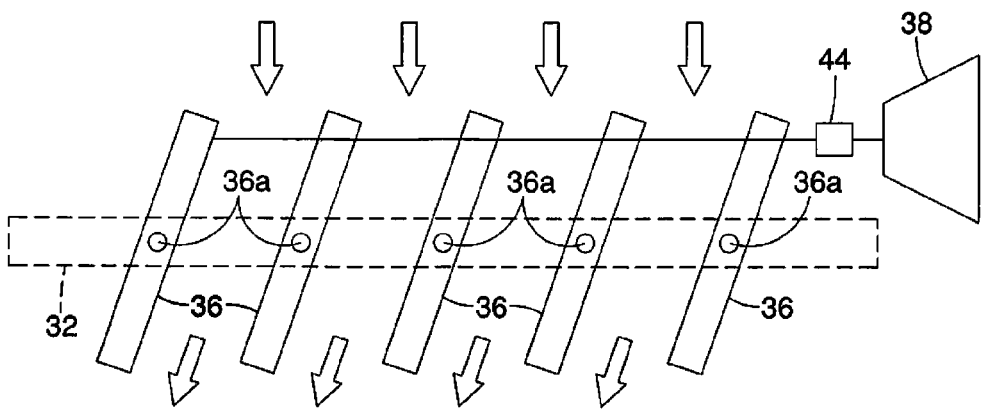
FIG. 7 is yet another schematic view of the vertically oriented vanes of the vent assembly similar to FIGS. 5 and 6 showing the vertically oriented vanes pivoted in a second direction by the positioning device in accordance with the first embodiment.

As shown in FIGS. 5-7, the connecting rod 36b is further connected to the positioning device 38. The positioning device 38 moves the vertically extending vanes 36 to any of a plurality of aiming directions, including the three aiming directions depicted in FIGS. 5-7. The positioning device 38 can be an electric motor, a pneumatic piston/cylinder mechanism, or other appropriate device configured for providing linear movement that has sufficient precision movement to position and re-position the vertically extending vanes 36 in a manner described in greater detail below. Since positioning devices are conventional mechanical devices, further description is omitted for the sake of brevity.

In the depicted embodiment, the positioning device 38 is only provided for the manipulation of the plurality of vertically extending vanes 36. However, it should be understood that there can be applications where the positioning device 38 could be used to control direction of airflow via positioning and re-positioning of the plurality of horizontally extending vanes 34.

The connecting rod 36b is also optionally provided with a friction connecting device 44 located the plurality of vertically extending vanes 36 and the positioning device 38. The friction connecting device 44 allows for movement of the plurality of vertically extending vanes 36 independent of the operation of the positioning device 38 such that the plurality of vertically extending vanes 36 can be manually re-positioned independent of operation of the positioning device in response to sufficient force being applied by the vehicle passenger to the plurality of vertically extending vanes 36 to overcome a predetermined level of friction generated within the friction connecting device 44, and change the initial aiming of the plurality of vertically oriented vanes 36. The friction connecting device 44 can be as simple as a slip joint in the connecting rod 36b, where the connecting rod 36b is split into two portions and held together by a tightly biased elastic member or a piston/cylinder arrangement that generates friction to link two portions of the connecting rod 36b together.

Figure 4:
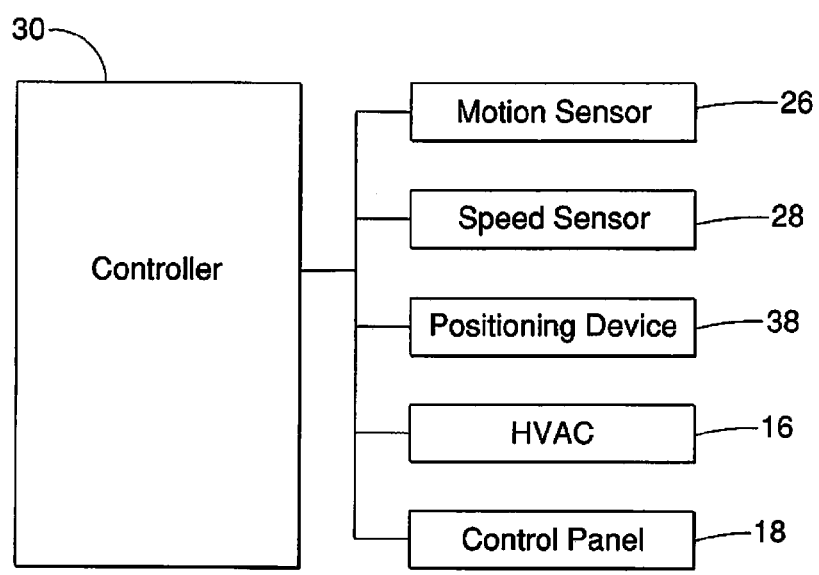
FIG. 4 is a schematic view of the vent positioning system showing a controller connected to an HVAC system, the positioning device and sensors in accordance with the first embodiment.

A description of the controller 30 is now provided with reference to FIG. 4. The controller 30 is electronically connected to the HVAC system 16, the control panel 18, the motion sensor 26, the speed sensor 28 and the positioning device 38. The controller 30 is configured to operate the positioning device 38 to re-position the vertically extending vanes 36 from aiming the airflow in a first airflow direction to aiming the airflow in a second airflow direction in response to the controller 30 determining via signals from the motion sensor 26 that the vehicle 10 is changing direction of movement. The controller 30 is further configured to operate the positioning device 38 to re-position the vertically extending vanes 36 aiming airflow in the second airflow direction to aiming airflow in the first airflow direction in response to the controller 30 determining via signals from the motion sensor 26 that the vehicle 10 has completed changing direction of movement.

In other words, when the controller 30 detects that the vehicle 10 is making a right turn, the controller 30 operates the positioning device 38 to turn the vertically extending vanes 36 to alter the direction of the airflow from the vent assembly 20. When the controller 30 determines that the right turn is completed, the controller 30 operates the positioning device 38 to return the vertically extending vanes 36 to their previous positions.

Similarly, when the controller 30 detects that the vehicle 10 is making a left turn, the controller 30 operates the positioning device 38 to turn the vertically extending vanes 36 to alter the direction of the airflow from the vent assembly 20. When the controller 30 determines that the left turn is completed, the controller 30 operates the positioning device 38 to return the vertically extending vanes 36 to their previous positions.

The controller 30 also determines the speed of the vehicle 10 via signals from the speed sensor 28 and prevents operation of the positioning device 38 in response to determining that the speed of movement of the vehicle 10 is below a predetermined speed during changing direction of movement. For example, if the right turn or the left turn occurs as speed of below 10 miles an hour, there may be no need for altering the position of the vertically extending vanes 36. The controller 30 enables operation of the positioning device 38 in response to determining that the speed of movement of the vehicle is above the predetermined value during changing direction of movement. The predetermined value can be 5 miles an hour, 10 miles an hour or 15 miles an hour, as examples. The actual predetermined value can vary vehicle to vehicle and is not a fixed value for purposes of understanding the vent positioning system 12. The actual value of the predetermined value (speed) is determined based upon the overall design criteria of the vehicle 10.

The controller 30 can also disengage the vent positioning system 12 operation in response to settings on the control panel 18. For example, if the HVAC system 16 is not operating, or if the blower 24 is operating at a very low speed the controller 30 can cease operation of the vent positioning system 12. Further, the control panel 18 can include a setting whereby the vent positioning system 12 can be enabled or can be completely shut off, depending upon the preferences of the vehicle operator and/or vehicle passenger.

To provide a better understanding of the vent positioning system 12, the following examples are explained with respect to FIGS. 8-14.

Figure 8:
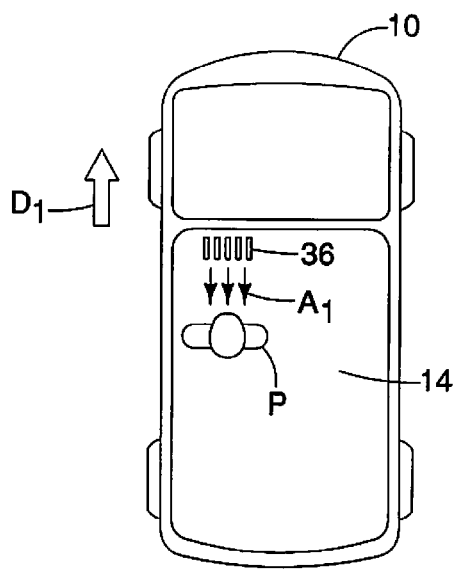
FIG. 8 is a diagrammatic view of the vehicle moving forward in a first direction with air from one of the vent assemblies moving in a first airflow direction in accordance with the first embodiment.

In FIG. 8, the vehicle 10 is moving in a straight direction $D_1$ at a speed sufficient for the controller 30 to enable the vent positioning system 12. The HVAC system 16 is operating and airflow is exiting the vent assembly 20. The vertically extending vanes 36 are such that the first orientation aims the airflow directly rearward toward the vehicle operator P. Hence, while the vehicle 10 is moving in the direction $D_1$, the airflow moves in the airflow direction $A_1$.

Figure 9:
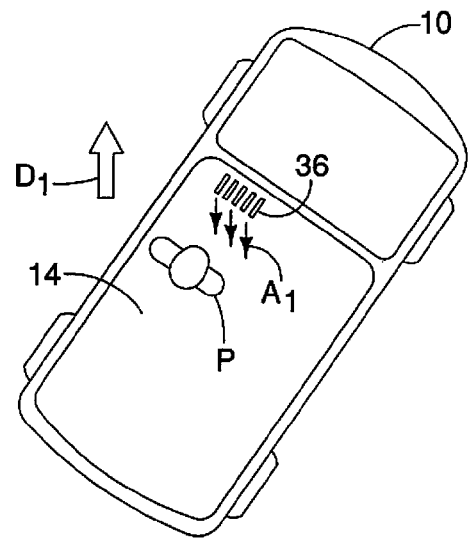
FIG. 9 is a diagrammatic view of the vehicle beginning a right turn showing the air from the vent assembly continuing to move in the first airflow direction due to Newton's laws of motion in accordance with the first embodiment.
Figure 10:
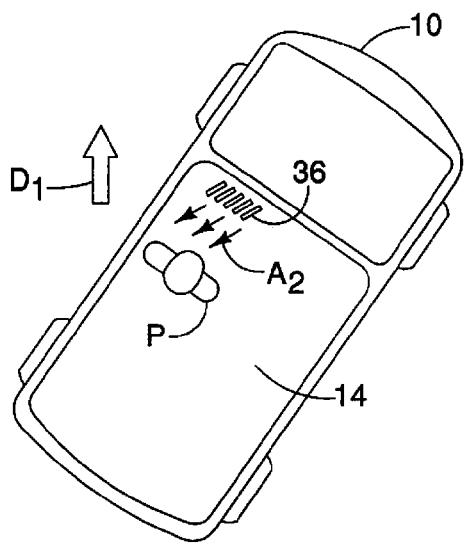
FIG. 10 is another diagrammatic view of the vehicle beginning the right turn showing the vehicle in the same orientation as depicted in FIG. 9, but showing the vertically extending vanes pivoted clockwise relative to the vehicle to move air in a second airflow direction in accordance with the first embodiment.

In FIG. 9, the vehicle 10 begins turning to the right. Air that has already left the vent assembly 20 continues in the airflow direction $A_1$ as previously directed by the vent assembly 20 prior to the right turn due to Newton's laws of motion. In other words, as the right turn of the vehicle 10 begins, the air that has already exited the vent assembly 20 prior to the turn continues traveling in the airflow direction $A_1$ as indicated in FIG. 9. In the absence of operation of the vent positioning system 12, the vehicle operator P would briefly no longer receive direct airflow from the vent assembly 20. However, as shown in FIG. 10, with the controller 30 enabling the vent positioning system 12, the controller 30 determines that the vehicle 10 is making a right turn and operates the positioning device 38 pivoting the vertically oriented vanes 36 in a clockwise direction relative to the vehicle 10, causing the airflow to flow in an airflow direction $A_2$ (a second orientation) to the left of the vehicle operator P. FIGS. 9 and 10 show the vehicle 10 in the same orientation. FIG. 9 shows the air that exited the vent assembly 20 prior to the right turn moving in airflow direction $A_1$, while FIG. 10 show the air exiting the vent assembly 20 being moved in the airflow direction $A_2$.

Figure 11:
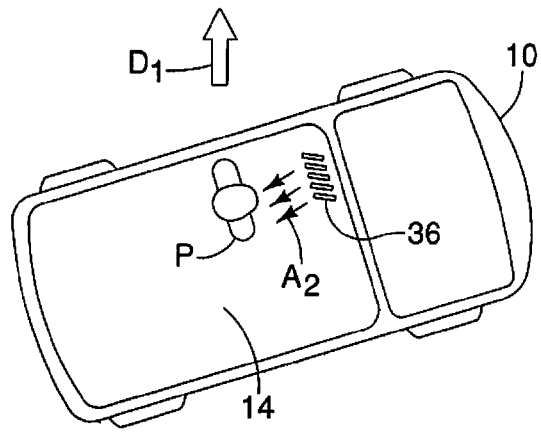
FIG. 11 is another diagrammatic view of the vehicle continuing the right turn showing the air that has left the vent assembly continuing to move in the second airflow direction due to Newton's laws of motion in accordance with the first embodiment.
Figure 12:
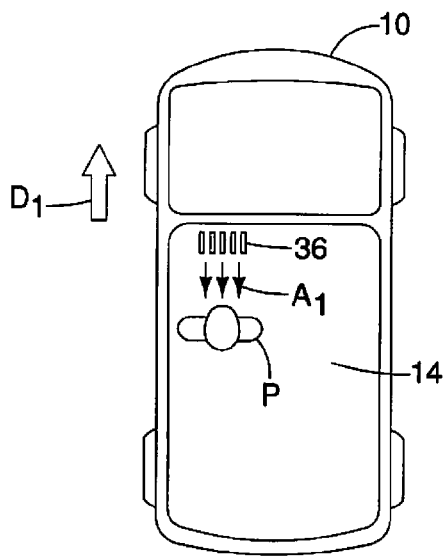
FIG. 12 is a diagrammatic view of the vehicle again moving forward in the first direction with air from one of the vent assemblies moving in the first airflow direction in accordance with the first embodiment.

As the turn of the vehicle 10 moves toward completion, as shown in FIG. 11, the air that moved out of the vent assembly 20 at the orientation show in FIG. 10 continues to move in the airflow direction $A_2$ due to Newton's laws of motion. The result is that the passenger P continues to receive airflow from the vent assembly 20 during the right turn due to re-positioning of the vertically extending vanes 36 by the vent positioning system 12. After completion of the right turn, the controller 30 operates the positioning device 38 and returns the vertically extending vanes 36 to their original position (relative to the vehicle 10) such that airflow therefrom moves directly toward the vehicle operator P again.

As shown in FIGS. 12-15, the operation of the vent positioning system 12 has a similar effect. Specifically in FIG. 12, the vehicle 10 is moving in a straight direction $D_1$ at a speed sufficient for the controller 30 to enable the vent positioning system 12. The HVAC system 16 is operating and airflow is exiting the vent assembly 20. The vertically extending vanes 36 are aimed such that the airflow moves directly rearward toward the vehicle operator P. Hence, while the vehicle 10 is moving in the direction $D_1$, the airflow moves in the airflow direction $A_1$.

Figure 13:
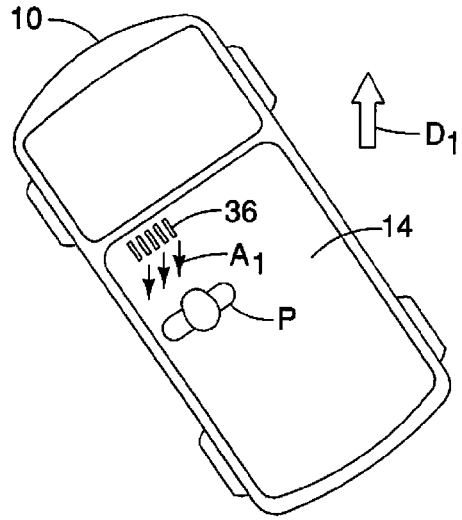
FIG. 13 is a diagrammatic view of the vehicle beginning a left turn showing the air from the vent assembly continuing to move in the first airflow direction due to Newton's laws of motion in accordance with the first embodiment.
Figure 14:
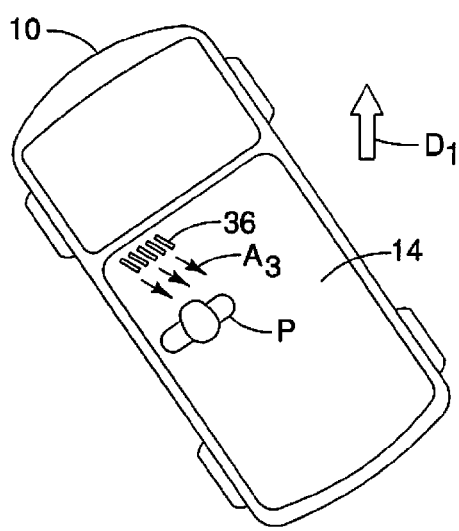
FIG. 14 is another diagrammatic view of the vehicle beginning the left turn showing the vehicle in the same orientation as depicted in FIG. 13, but showing the vertically extending vanes pivoted counter-clockwise relative to the vehicle to move air in a third airflow direction in accordance with the first embodiment.

In FIG. 13, the vehicle 10 begins turning to the left. Air that has already left the vent assembly 20 continues in the airflow direction $A_1$ as previously directed by the vent assembly 20 prior to the left turn due to Newton's laws of motion. In other words, as the left turn of the vehicle 10 begins, the air that has already exited the vent assembly 20 prior to the turn continues traveling in the airflow direction $A_1$ as indicated in FIG. 13. In the absence of operation of the vent positioning system 12, the vehicle operator P would briefly no longer receive direct airflow from the vent assembly 20. However, as shown in FIG. 14, with the controller 30 enabling the vent positioning system 12, the controller 30 determines that the vehicle 10 is making a left turn and operates the positioning device 38 pivoting the vertically oriented vanes 36 in a counter-clockwise direction relative to the vehicle 10, causing the airflow to flow in an airflow direction $A_3$ to the right of the vehicle operator P. FIGS. 13 and 14 show the vehicle 10 in the same orientation. FIG. 13 shows the air that exited the vent assembly 20 prior to the left turn moving in airflow direction $A_1$, while FIG. 14 show the air exiting the vent assembly 20 being moved in the airflow direction $A_3$.

Figure 15:
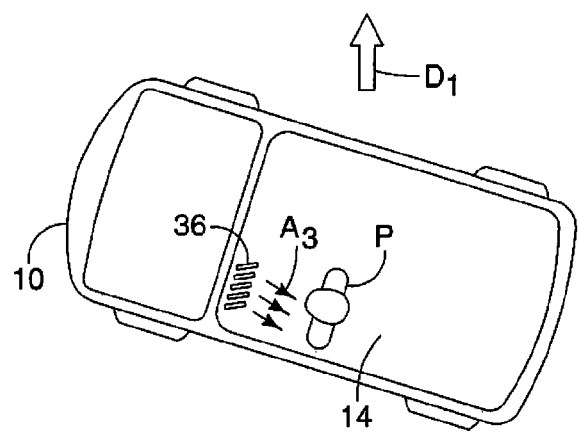
FIG. 15 is another diagrammatic view of the vehicle continuing the left turn showing the air that has left the vent assembly continuing to move in the third airflow direction due to Newton's laws of motion in accordance with the first embodiment.

As the turn of the vehicle 10 moves toward completion, as shown in FIG. 15, the air that moved out of the vent assembly 20 at the orientation show in FIG. 14 continues to move in the airflow direction $A_3$ due to Newton's laws of motion. The result is that the passenger P continues to receive airflow from the vent assembly 20 during the left turn due to re-positioning of the vertically extending vanes 36 by the vent positioning system 12. After completion of the left turn, the controller 30 operates the positioning device 38 and returns the vertically extending vanes 36 to their original position (relative to the vehicle 10) such that airflow therefrom moves directly toward the vehicle operator P again.

Figure 16:
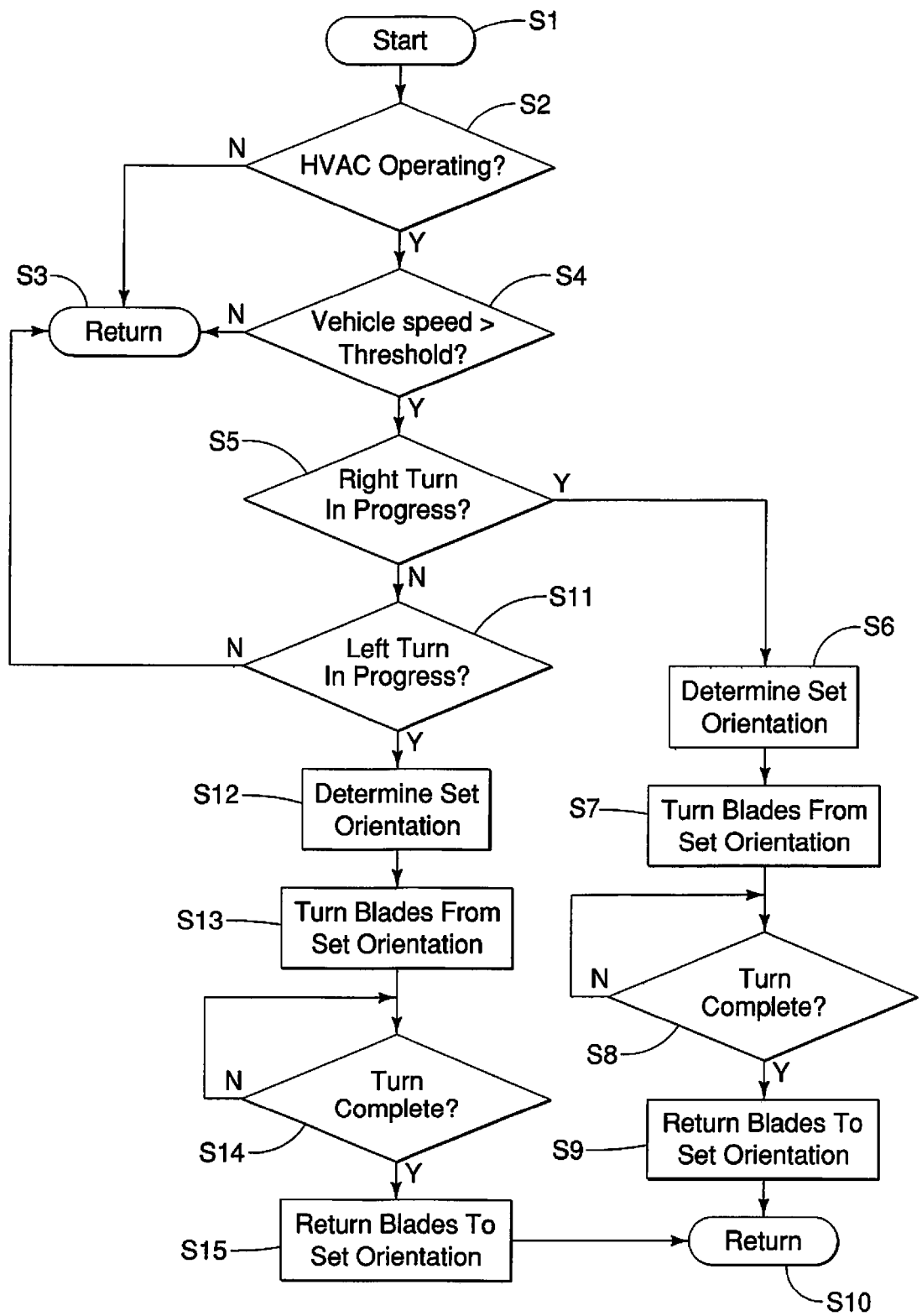
FIG. 16 is a flowchart showing basic operational steps conducted by the controller in the operation of the vent positioning system in accordance with the first embodiment.

The basic logic of the operation of the controller 30 is now described with specific reference to FIG. 16. At step S1, the vehicle 10 is operating and the controller 30 begins monitoring the HVAC system 16, the motion sensor 26 and the speed sensor 28. At step S2, the controller 30 determines whether or not the HVAC system 16 and the blower 24 are operating and whether or not the airflow is being directed to the vent assemblies 20. If the HVAC system 16 is not operating; if the blower 24 is operating below a predetermined threshold speed; if the control panel 18 is set to dis-able the vent positioning system 12; or if the airflow is not being directed to the vent assemblies 20 (for example, the HVAC system 16 is in defogger mode), then operation moves to step S3 and operation returns to a stand-by mode awaiting changes in the settings of the HVAC system 16. If at step S2, the HVAC system 16 is operating, the blower 24 is operating above the predetermined threshold speed, the control panel 18 is set to enable the vent positioning system 12 and the airflow is being directed to the vent assemblies 20, then operation moves to step S4.

At step S4, the controller 30 whether or not the vehicle 10 is moving at a speed greater than the predetermined speed threshold. If the speed is below the threshold, then operation moves to step S3. If the speed is greater than the threshold, then operation moves to step S5.

At step S5, the controller 30 determines whether or not a right turn is in progress. If a right turn is not in progress, operation moves to step S11 (described below). If a right turn is in progress, then operation moves to step S6. At step S6, the controller 30 determines the current setting of the positioning device 38, which corresponds to the current set orientation (the airflow aiming direction) of the vertically extending vanes 36. Next at step S7, the controller 30 operates the positioning device 38 to pivot the vertically extending vanes 36 in a clockwise direction in order to divert the airflow from the vent assembly 20 such that the airflow continues to move in a direction approximately corresponding to the direction of airflow from the vent assembly 20 relative to the location of the vehicle passenger P.

At step S8, the controller 30 determines whether or not the right turn is completed. If the right turn is not completed, operation continues at step S8. If the right turn is completed, operation moves to step S9 where the controller 30 operates the positioning device 38 to pivot the vertically extending vanes 36 in a counter-clockwise direction in order to return the vertically oriented vanes 36 of the vent assembly 20 to the first orientation relative to the vehicle 10 and the vent assembly 20.

Operation then moves to step S10 where the controller 30 moves to a standby mode, continuing to monitor the motion sensor 26 and the speed sensor 28.

At step S11, the controller 30 determines whether or not a left turn is in progress. If a left turn is not in progress, operation moves to step S3. If a left turn is in progress, then operation moves to step S12. At step S12, the controller 30 determines the current setting of the positioning device 38, which corresponds to the current set orientation (the airflow aiming direction) of the vertically extending vanes 36. Next at step S13, the controller 30 operates the positioning device 38 to pivot the vertically extending vanes 36 in a counter-clockwise direction in order to divert the airflow from the vent assembly 20 such that the airflow continues to move in a direction approximately corresponding to the direction of airflow from the vent assembly 20 relative to the location of the vehicle passenger P.

At step S14, the controller 30 determines whether or not the left turn is completed. If the left turn is not completed, operation continues at step S14. If the left turn is completed, operation moves to step S15 where the controller 30 operates the positioning device 38 to pivot the vertically extending vanes 36 in a clockwise direction in order to return the vertically oriented vanes 36 of the vent assembly 20 to the first orientation relative to the vehicle 10 and the vent assembly 20.

Operation then moves to step S10 where the controller 30 moves to a standby mode, continuing to monitor the motion sensor 26 and the speed sensor 28.

The above description of the logic in FIG. 16 refers to only vent assembly 20. However it should be understood from the drawings and the description herein that the logic in FIG. 16 applies to operation of the positioning devices 38 in each of the vent assemblies 20 installed to the instrument panel 22 of the vehicle 10. The positioning devices 38 of the vent assemblies 20 are operated synchronously (in unison) by the controller 30.

The vent positioning system 12 is configured to compensate for the movement of the airflow from the vent assemblies 20 during left and right turns of the vehicle 10. During a turn, airflow that has moved out of the vent assemblies 20 just prior to the beginning of the turn, continues to move in its original direction due the principals expressed in Newton's laws of motion. By pivoting the vertically extending vanes 36 in response to detecting that a turn is in progress to compensate for the movement of the airflow, the direction of the airflow relative to a vehicle passenger can be approximately maintained.

In hot weather, when the vehicle passenger has set the HVAC system 16 to blow cool air toward the face of the vehicle passenger, the operation of the vent positioning system 12 can maintain the airflow to the vehicle passenger even while the vehicle is turning. In the absence of a vent positioning system 12, the vehicle passenger could be deprived of the airflow of cooled air during a turn. The vent positioning system 12 serves to maintain airflow in the aiming direction of the vent assemblies 20 while the vehicle 10 is turning.

The controller 30 preferably includes a microcomputer with a vent positioning system control program that controls the positioning device 38. The controller 30 can also include other conventional components such as an input interface circuit, an output interface circuit, and storage devices such as a ROM (Read Only Memory) device and a RAM (Random Access Memory) device. A microcomputer of the controller 30 is programmed to control the vent positioning system 12. The memory circuit stores processing results and control programs such as ones for vent positioning system operation that are run by the processor circuit. The controller 30 is operatively coupled to the elements of the HVAC system 16 and the vent positioning system 12 in a conventional manner. The internal RAM of the controller 30 stores statuses of operational flags and various control data. The controller 30 is capable of selectively controlling any of the components of the vent positioning system 12 in accordance with the control program. It will be apparent to those skilled in the art from this disclosure that the precise structure and algorithms for the controller 30 can be any combination of hardware and software that will carry out the functions of the present invention.

The vehicle 10 includes various mechanisms and elements are conventional components that are well known in the art. Since vehicle elements and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vent positioning system. Accordingly, these terms, as utilized to describe the present invention should be interpreted relative to a vehicle equipped with the vent positioning system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle vent positioning apparatus comprising:
a motion sensor installed to a vehicle and detecting changes in direction of movement of the vehicle;

a blower of an HVAC system within the vehicle operable to move air into a passenger compartment of the vehicle;

at least one vent assembly installed within the vehicle to direct airflow from the blower into a passenger compartment, the vent assembly including at least one vane positionable to aim airflow moving through the vent and into the passenger compartment in a plurality of differing airflow directions a positioning device connected to the vane; and a controller connected to the motion sensor and the positioning device, the controller being configured to operate the positioning device to re-position the vane from aiming the airflow in a first airflow direction to aiming the airflow in a second airflow direction in response to the controller determining via signals from the motion sensor that the vehicle is changing direction of movement, and the controller is further configured to operate the positioning device to re-position the vane aiming airflow in the second airflow direction to aiming airflow in the first airflow direction in response to the controller determining via signals from the motion sensor that the vehicle has completed changing direction of movement.

2. The vehicle vent positioning apparatus according to claim 1, further comprising a speed sensor installed to the vehicle detecting speed of movement of the vehicle, the controller being connected to the speed sensor, and the controller being configured to prevent operation of the positioning device in response to determining that the speed of movement of the vehicle is below a predetermined speed during changing direction of movement and enable operation of the positioning device in response to determining that the speed of movement of the vehicle is above a predetermined value during changing direction of movement.

3. The vehicle vent positioning apparatus according to claim 1, wherein the vane of the vent assembly comprises a plurality of vanes coupled to one another for synchronized movement.

4. The vehicle vent positioning apparatus according to claim 3, wherein the plurality of vanes are vertically oriented and are parallel to one another, each of the plurality of vanes being pivotal about a corresponding vertically extending axis.

5. The vehicle vent positioning apparatus according to claim 3, further comprising:

a second vent assembly installed within the vehicle to direct airflow from the blower into a passenger compartment, the second vent assembly including a plurality of second vanes coupled to one another for synchronized movement such that the plurality of second vanes are positionable to aim airflow moving into the passenger compartment in a plurality of differing airflow directions; and a second positioning device connected to the plurality of vanes, and the controller being connected to the second positioning device and being further configured to operate the second positioning device to re-position the plurality of second vanes aiming the airflow in a third airflow direction to aiming the airflow in a fourth airflow direction in response to the controller determining via signals from the motion sensor that the vehicle is changing direction of movement.

6. The vehicle vent positioning apparatus according to claim 1, further comprising:

a second vent assembly installed within the vehicle to direct airflow from the blower into a passenger compartment, the second vent assembly including a second vane positionable to aim airflow moving into the passenger compartment in a plurality of differing airflow directions; and a second positioning device connected to the second vane, and the controller being connected to the second positioning device and being further configured to operate the second positioning device to re-position the second vane aiming the airflow in a third airflow direction to aiming the airflow in a fourth airflow direction in response to the controller determining via signals from the motion sensor that the vehicle is changing direction of movement.

7. The vehicle vent positioning apparatus according to claim 1, wherein the at least one vent assembly includes a friction connecting device operably disposed between the vane and the positioning device such that the vane can be manually re-positioned independent of operation of the positioning device in response to sufficient force being applied by a vehicle passenger to the vane to overcome a predetermined level of friction generated within the friction connecting device.

8. The vehicle vent positioning apparatus according to claim 7, wherein the controller is further configured to operate the second positioning device to re-position the second vane from aiming airflow in the fourth airflow direction to aiming airflow in the third airflow direction in response to the controller determining via signals from the motion sensor that the vehicle has completed changing direction of movement.

9. The vehicle vent positioning apparatus according to claim 1, wherein the motion sensor detecting changes in direction of movement of the vehicle include detecting that the vehicle is making a right turn and detecting that the vehicle is making a left turn.

10. A method for positioning vehicle vent vanes, comprising:

blowing air into a passenger compartment of a vehicle through at least one vent assembly having a vane moveable to aim air flowing therethrough in any of a plurality of airflow directions into the passenger compartment;

detecting changes in direction of movement of the vehicle via a motion sensor;

operating a positioning device to move the vane from a first orientation to a second orientation in response to determining that changes in direction of the vehicle includes turning of the vehicle; and moving the vane from the second orientation back to the first orientation in response to determining that the turning of the vehicle is completed.

11. The method according to claim 10, wherein detecting the speed of the vehicle and preventing operation of the positioning device in response to determining that the speed of movement of the vehicle is below a predetermined speed during changing direction of movement and enabling operation of the positioning device in response to determining that the speed of movement of the vehicle is above a predetermined value during changing direction of movement.

12. The method according to claim 10, wherein the operating the positioning device includes pivoting the vane about corresponding vertically extending axes.

13. The method according to claim 10, wherein the operating the positioning device includes synchronously pivoting a plurality of vanes about corresponding vertically extending axes.

14. The method according to claim 10, wherein the detecting changes in direction of movement of the vehicle include detecting the vehicle making a right turn and detecting the vehicle making a left turn.

* * * * *